(12) United States Patent
Cheng

(10) Patent No.: US 6,291,593 B1
(45) Date of Patent: Sep. 18, 2001

(54) ADHESIVE COMPOSITIONS WITH RETARDING ADDITIVE

(75) Inventor: Haitao Cheng, East Hampstead, NH (US)

(73) Assignee: Loctite Corporation, Rocky Hill, CT (US)

( * ) Notice: Subject to any disclaimer, the term of this patent is extended or adjusted under 35 U.S.C. 154(b) by 0 days.

(21) Appl. No.: 09/452,626

(22) Filed: Dec. 1, 1999

Related U.S. Application Data

(60) Provisional application No. 60/110,708, filed on Dec. 3, 1998, and provisional application No. 60/114,941, filed on Jan. 5, 1999.

(51) Int. Cl.$^7$ .......................... C08L 33/06; C08L 23/34; C08K 3/24; C08K 3/10; C09J 133/06; C09J 123/34
(52) U.S. Cl. ................ 525/292; 525/245; 525/247; 525/309; 525/310; 525/905; 156/333; 156/327
(58) Field of Search .................... 525/245, 247, 525/292, 309, 310, 905

(56) References Cited

U.S. PATENT DOCUMENTS

| | | | |
|---|---|---|---|
| 3,880,580 | 4/1975 | Horowitz et al. | 525/345 |
| 3,880,956 | 4/1975 | Skoultchi | 524/297 |
| 3,907,623 | 9/1975 | Dowbenko | 156/77 |
| 4,022,954 | 5/1977 | Kurosawa et al. | 525/344 |
| 4,192,789 | 3/1980 | Smith et al. | 525/437 |
| 4,361,670 | 11/1982 | Sugama et al. | 524/811 |
| 4,403,058 * | 9/1983 | Dohi et al. | 525/310 |
| 4,536,546 | 8/1985 | Briggs | 525/83 |
| 4,574,142 * | 3/1986 | Charnock | 525/310 |
| 4,596,857 * | 6/1986 | Doi et al. | 525/310 |
| 4,666,991 * | 5/1987 | Matsui et al. | 525/905 |
| 4,714,730 | 12/1987 | Briggs et al. | 524/321 |
| 4,849,468 * | 7/1989 | Murachi et al. | 525/292 |
| 4,942,201 | 7/1990 | Briggs et al. | 525/71 |
| 5,106,928 | 4/1992 | Skoultchi et al. | 526/196 |
| 5,143,884 | 9/1992 | Skoultchi | 502/160 |
| 5,212,229 | 5/1993 | Taylor et al. | 524/556 |
| 5,286,821 | 2/1994 | Skoultchi | 526/196 |
| 5,328,947 * | 7/1994 | Taguchi et al. | 525/310 |
| 5,376,746 | 12/1994 | Skoultchi | 526/196 |
| 5,625,006 | 4/1997 | Callahan, Jr. et al. | 525/291 |
| 5,661,219 | 8/1997 | Nakane et al. | 525/166 |
| 5,686,544 | 11/1997 | Pocius | 525/130 |
| 5,703,256 | 12/1997 | Cusumano et al. | 554/229 |
| 5,726,248 | 3/1998 | Wideman et al. | 525/169 |
| 5,900,462 | 5/1999 | Tanaka | 525/303 |
| 5,919,867 | 7/1999 | Yasuda et al. | 525/299 |
| 5,932,282 | 8/1999 | Diener et al. | 427/140 |
| 5,932,344 | 8/1999 | Ikemoto et al. | 428/343 |
| 5,935,711 | 8/1999 | Pocius et al. | 526/196 |
| 5,964,979 | 10/1999 | George et al. | 156/295 |

FOREIGN PATENT DOCUMENTS

| | | | |
|---|---|---|---|
| 129289 * | 11/1978 | (JP) | 525/309 |
| 16561 * | 2/1981 | (JP) | 525/310 |
| 104883 * | 5/1987 | (JP) | 525/245 |
| 81/03177 * | 11/1981 | (WO) | 525/310 |

* cited by examiner

*Primary Examiner*—Peter Szekely
(74) *Attorney, Agent, or Firm*—Pearne & Gordon LLP

(57) ABSTRACT

A methacrylate ester or acrylate ester adhesive composition including a retarding additive to extend the open time and/or reduce the peak exotherm temperature. The retarding additive is selected from the group consisting of non-protonic Lewis acids and zinc salts and mixtures thereof.

26 Claims, 1 Drawing Sheet

ADHESIVE COMPOSITIONS WITH RETARDING ADDITIVE

This application claims the benefit of U.S. Provisional Application Serial No. 60/110,708 filed Dec. 3, 1998 and U.S. Provisional Application Serial No. 60/114,941 filed Jan. 5, 1999. The entire contents of both of these are incorporated herein by reference.

FIELD OF THE INVENTION

The present invention relates generally to adhesives and more particularly to acrylic adhesives containing an inventive retarding additive to increase open time and provide other benefits.

BACKGROUND OF THE INVENTION

As used herein, "acrylic adhesives" includes methacrylic, acrylate and methacrylate adhesives. Two-component, reactive acrylic adhesives are frequently used for fabrication of plastic and metal assemblies in marine, transportation, and various other industrial applications. These adhesives offer structural bond strength, fast set time, and good resistance to temperature extremes. Acrylic adhesives, particularly methacrylate adhesives, are known in the art, which art is incorporated herein by reference; see for example U.S. Pat. Nos. 4,536,546; 4,714,730; 4,942,201 and the patents cited therein, the contents of all of which are incorporated herein by reference. Some drawbacks to using reactive acrylic and methacrylate adhesives are related to their use and cure characteristics. Acrylic adhesives, particularly methacrylate adhesives, are volatile; methacrylate adhesives are based on methyl methacrylate and other volatile methacrylate monomers. Surface evaporation of dispensed acrylic adhesives thus eventually form a dry film which results in reduced open time. Another drawback relates to the heat evolved (i.e. exotherm) while the adhesive sets or cures. Highly exothermic adhesives can distort heat sensitive substrates, such as fiber-reinforced polyester (FRP) and numerous thermoplastics. A third drawback of acrylic adhesives, particularly methacrylate adhesives, is reduced shelf-life compared to other structural adhesives like epoxies and polyurethanes. Unlike epoxies or polyurethanes, methacrylate adhesives cure by free-radical polymerization preferably initiated by certain peroxide initiators (e.g. cumene hydroperoxide or benzoyl peroxide). Since peroxides degrade more rapidly than the curing agents of epoxy or urethane technology, acrylic and methacrylate adhesives tend to be less stable.

There is a need for acrylic adhesives, particularly acrylate and methacrylate adhesives, which have longer open time and lower maximum or peak exotherm temperatures. The present invention discloses the use of inventive retarding additives which provide such improved acrylic, particularly methacrylate, adhesives.

SUMMARY OF THE INVENTION

An adhesive composition is provided which comprises 10–90 weight percent ester monomer, about 2–85 weight percent polymeric elastomer, about 0.02–10 weight percent initiator, and about 0.005–7 weight percent of a retarding additive. The retarding additive is selected from the group consisting of non-protonic Lewis acids and zinc salts and mixtures thereof. The ester monomer is selected from the group consisting of methacrylate ester monomers, acrylate ester monomers and mixtures thereof. A kit for providing a two-component reactive adhesive composition in accordance with the invention is also provided. The kit comprises a Part A chamber and a Part B chamber. The Part A chamber contains a Part A composition and the Part B chamber contains a Part B composition which is reactable with the Part A composition to yield an adhesive composition according to the invention.

DETAILED DESCRIPTION OF THE PREFERRED EMBODIMENTS OF THE INVENTION

Figure 1:
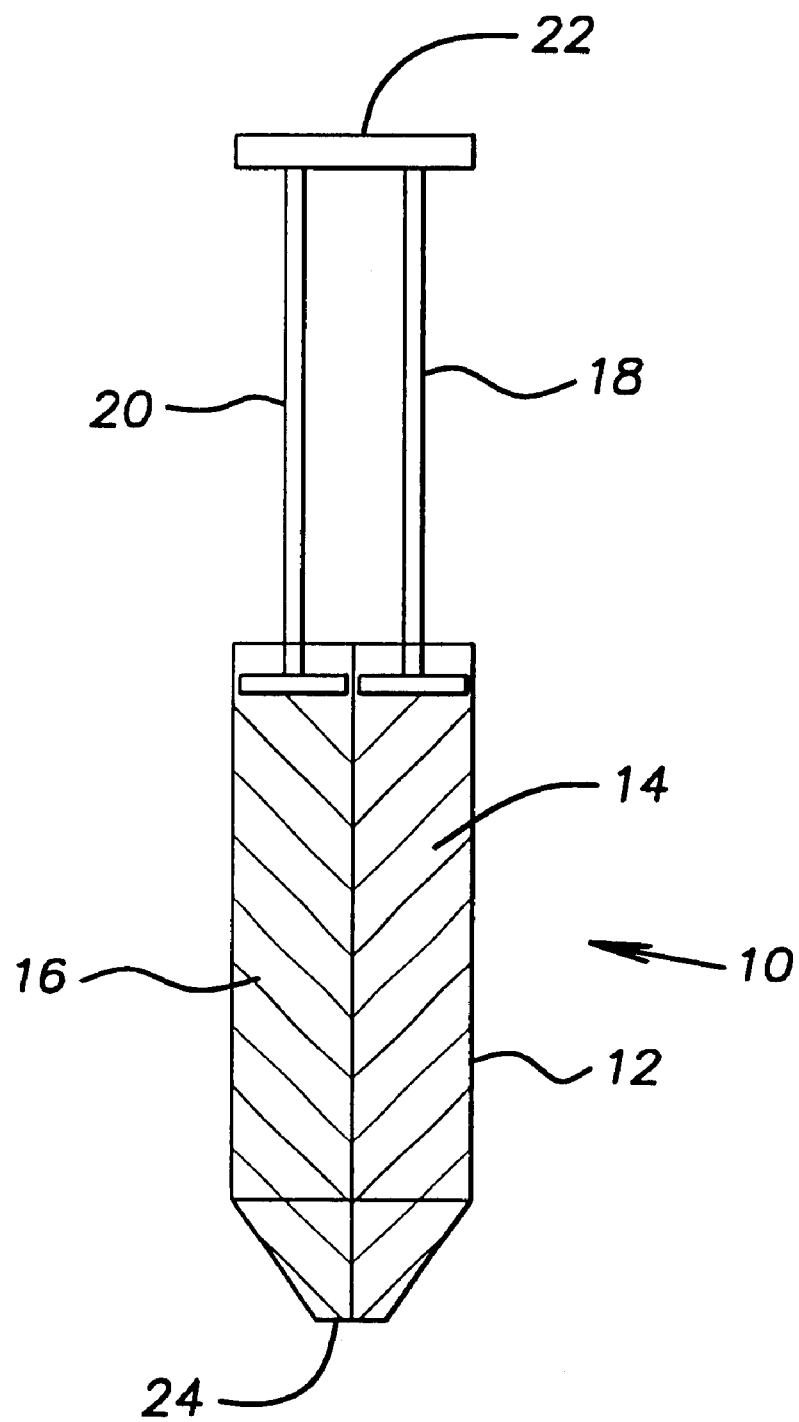
FIG. 1 is a schematic representation of a two-chamber applicator adapted to dispense a two-component reactive adhesive according to the present invention.

As used herein and in the claims, the following terms have the following meanings or definitions. Parts are parts by weight and percentages are weight percent unless otherwise indicated or apparent. "Open time" is the amount of time, after the adhesive is applied onto a first substrate, that the adhesive maintains sufficient tack to bond effectively to a second substrate. "Exotherm time" is the amount of time it takes for a 20 g adhesive mixture in an insulated 50 ml plastic beaker to reach its peak or maximum temperature during its exothermic cure. "Peak exotherm temperature" is the peak or maximum temperature that a 20 g adhesive mixture in an insulated 50 ml plastic beaker reaches during its exothermic cure. "Non-protonic Lewis acids" are those Lewis acids which are not protonic acids, i.e., excluding those acids which have an acidic hydrogen As used herein, when preferred range such as 5–25 is given, this means preferably at least 5 and, separately and independently, preferably not more than 25.

The invented adhesive composition (with Part A and Part B combined) has the following preferred formulation or table of components. In this formulation or table of components, any preferred or less preferred weight percent or weight percent range of any component can be combined with any preferred or less preferred weight percent or weight percent range of any of the other components; it is not required or necessary that all or any of the weight percents or weight percent ranges come from the same column.

| Component | Weight Percent | | |
| --- | --- | --- | --- |
| | Preferred | Less Preferred | Less Preferred |
| 1. Ester monomer | 59 | 54–64 | 30–84 |
| | | 50–70 | 20–87 |
| | | 45–75 | 10–90 |
| | | 40–80 | |
| 2. Acid monomer | 2 | 1–4 | 0.2–8 |
| | | 0.5–6 | 0–10 |
| 3. Polymeric elastomer | 20 | 18–25 | 8–50 |
| | | 16–30 | 5–60 |
| | | 13–35 | 3–70 |
| | | 10–40 | 2–85 |
| 4. Polymeric modifier | 15 | 10–20 | 1–30 |
| | | 5–25 | 0–30 |
| 5. Antioxidant | 1 | 0.5–3 | 0–5 |
| 6. Inhibitor | 0.05 | 0.01–0.1 | 0–0.2 |
| 7. Scavenger | 0.05 | 0.01–0.1 | 0–0.2 |
| 8. Initiator | 2.8 | 2–4 | 0.5–8 |
| | | 1–6 | 0.1–10 |
| | | | 0.02–10 |
| 9. Activator | 1 | 0.5–2.5 | 0.1–5 |
| | | | 0–5 |
| 10. Wax | 1 | 0.5–1.5 | 0–2 |

-continued

| Component | Weight Percent | | |
|---|---|---|---|
| | Preferred | Less Preferred | Less Preferred |
| 11. Inventive retarding additive | 0.8 | 0.5–1.5<br>0.2–2<br>0.1–3 | 0.05–5<br>0.01–7<br>0.005–7 |

The ester monomer is preferably a methacrylate ester monomer, preferably methyl methacrylate (MMA), less preferably 2-ethylhexyl methacrylate, hydroxyethyl methacrylate, cyclohexyl methacrylate, ethyl methacrylate, and butyl methacrylate, less preferably other methacrylate ester monomers wherein the alcohol portion of the ester group contains 1–8 carbon atoms, less preferably other methacrylate ester monomers known in the art.

Less preferably the ester monomer is an acrylate ester monomer, preferably methyl acrylate, ethyl acrylate, butyl acrylate and 2-ethylhexyl acrylate, less preferably other acrylate ester monomers wherein the alcohol portion of the ester group contains 1–8 carbon atoms, less preferably other acrylate ester monomers known in the art. Mixtures of any of the foregoing ester monomers can be used.

The acid monomer, which is a preferred optional component, is preferably methacrylic acid (MAA), less preferably acrylic acid, maleic acid, crotonic acid, and fumaric acid, less preferably other free-radical polymerizable acid monomers known in the art, preferably ethylenically unsaturated mono or polycarboxylic acids.

The polymeric elastomer is preferably chlorosulfonated polyethylene, less preferably chlorinated polyethylene, polychloroprene, or block copolymer rubber, less preferably other polymeric elastomers which are soluble in methacrylate/acrylate monomers, or mixtures of the foregoing.

The chlorosulfonated polyethylene preferably has 25–45 weight percent chlorine and 0.01–4, more preferably 0.2–3, more preferably 0.8–1.6, weight percent sulfur. Preferable resins are available from DuPont as Hypalon 20 and Hypalon 30. If the chlorosulfonated polyethylene is liquid, its weight percent in the overall formulation can go up to 70 or 80 or 85%.

The polychloroprene rubber is preferably neoprene, preferably Neoprene AD-5, AD-10 or WRT, available from DuPont-Dow Elastomers.

The block copolymer rubber is preferably block copolymers of either butadiene or isoprene with styrene (for example, SBS, SIS and SB) and are available from Shell as Kraton D-1116 and other Kraton or D-grade elastomers. Other elastomers with Tg below about 25° C., which are soluble in methacrylate/acrylate monomers, can be used in place of the polychloroprene and/or the block copolymer rubbers. Examples of such are homopolymer of epichlorohydrin and its copolymers with ethylene oxide, available from Zeon Chemicals as Hydrin, acrylate rubber pellets, available from Zeon as HyTemp, polyisoprene rubber, polybutadiene rubber, nitrile rubber, and SBR rubber (random copolymer of butadiene and styrene). If any of the above-mentioned elastomers is a liquid, its weight percent in the overall formulation can go up to 70 or 80 or 85%. As is known, the acrylic adhesive is made from a Part A and a Part B. As the weight ratio of A:B gets closer to 1:1, the weight percent of the polymeric elastomer more typically gets closer to 10%.

The polymeric modifier, which is a preferred optional component or ingredient, is preferably a core shell polymer or nitrile rubber particles or powder, less preferably a polymeric resin which acts as a thixotropic agent and/or toughener, such as polyamide powder such as Disparlon 6200 from King Industry. The core shell polymer is preferably a graft copolymer of the "core-shell" type. Preferred core shell polymers are acrylonitrile-butadiene-styrene (ABS), methacrylate-butadiene-styrene (MBS), and methacrylate-acrylonitrile-butadiene-styrene (MABS). Blendex 338 is an ABS powder from GE Plastics. Less preferred alternatives to the core shell polymer are all-acrylic copolymer resins such as Product Nos. KM330 and KM323B from Rohm and Haas. The preferred nitrile rubber powder is available from Goodyear as Chemigum P-83. Other resin fillers known in the art, which swell but do not dissolve in the monomer solution, can be used in place of nitrile rubber powder to provide paste-type consistency and further toughen the cured adhesive.

The antioxidant is preferably butylated hydroxy toluene (BHT), less preferably other antioxidants known in the art.

The inhibitor is a free-radical polymerization inhibitor, which increases shelf life and prevents or inhibits premature polymerization and is preferably hydroquinone (HQ) or methylhydroquinone, less preferably. BHT or other known free-radical polymerization inhibitors.

The scavenger is preferably etheylene diamine tetraacetic acid (EDTA) salt to scavenge metal ions, less preferably other known scavengers or chelators.

The initiator is a free-radical initiator and is preferably an organic peroxide or organic hydroperoxide, less preferably a perester or peracid, less preferably other free-radical initiators known in the art. Preferred initiators in the present invention are benzoyl peroxide, tert-butylperoxybenzoate (TBPB), cumene hydroperoxide (CHP), tertiary butyl hydroperoxide, dicumyl peroxide, and tertiary butyl peroxide acetate. A preferred initiator is Benox-50 from Norac, a peroxide paste containing 50% benzoyl peroxide. If chlorosulfonated polyethylene is used as an ingredient, the initiator is preferably about 1 weight percent peroxide and about 1.8 weight percent amine aldehyde condensate (preferably Reilcat ASY-2 from Reilly Industries, Beutene from Uniroyal or Vanax 80B from R. T. Vanderbilt, less preferably other amine aldehyde condensates known in the art), less preferably comparable amounts of amine aldehyde condensate without peroxide, less preferably peroxide with another amine or amines as known in the art and less preferably another amine as known in the art without peroxide. As is known in the art, peroxide is not a necessary component in a chlorosulfonated polyethylene system, but is a preferred component. If the polymeric elastomer is not chlorosulfonated polyethylene, the initiator is preferably a peroxide, hydroperoxide, perester or peracid as mentioned above, present at a weight percent of preferably about 4.5%, less preferably 2–6%, 1–8% or 0.1–10%.

The wax increases open time and is preferably Wax 1977 from IG International, less preferably honey bee wax or chlorinated wax or other waxes.

When the polymeric elastomer is chlorosulfonated polyethylene, an activator is not necessary when the initiator described above is used. When the polymeric elastomer is other than chlorosulfonated polyethylene, an activator is preferably used to accelerate the rate of polymerization and is preferably tertiary aromatic amine, preferably dimethyl toluidine (DMT) and/or 2,2'-(p-tolylimino)diethanol (TMD), less preferably a tertiary amine or others known in the art.

The Inventive retarding additive listed in the preferred formulation above is an additive selected from the group consisting of non-protonic Lewis acids and zinc salts and mixtures thereof. Among these, preferred are the non-protonic Lewis acids and the metal halides, more preferably the transition metal halides, preferably zinc halides, less preferably ferric halides and aluminum halides, preferably non-protonic Lewis acids containing Zn, Fe, Al, Sn, Ti and B. These compounds are strong electron acceptors. Preferred among the Inventive retarding additives are ferric bromide ($FeBr_3$), aluminum chloride ($AlCl_3$), tin chloride ($SnCl_4$), titanium chloride ($TiCl_4$), zinc cyanate ($Zn(CN)_2$), zinc sulfate ($ZnSO_4$), zinc sulfide (ZnS), zinc nitrate ($Zn(NO_3)_2$), zinc floride ($ZnF_2$), boron trif luoride ($BF_3$) or its ether complex, more preferably ferric chloride ($FeCl_3$), more preferably zinc bromide ($ZnBr_2$), most preferably zinc chloride ($ZnCl_2$) and zinc iodide ($ZnI_2$). The Inventive retarding additive or retarder acts as a retarder to extend the open time and/or to reduce the peak exotherm temperature.

Preferably, sufficient Inventive retarding additive is added to extend the open time of the adhesive composition at least 5, 10, 15, 20, 25, 30, 40, 50, 60, 80, 100, 120, 140, 160, 180, 200 and 220 minutes and/or to reduce the peak exotherm temperature at least 15, 20, 25, 30, 40, 50, 60, 80, 100 and 110° F.

Optionally whitening agents such as $TiO_2$, $CaCO_3$ and $Al_2O_3$ may be added to the adhesive composition, and UV resistance agents such as Tinuvin 400 from Ciba-Geigy may be added. Other additives known in the art may also be added in conventional amounts.

As is known in the art, these acrylate ester and methacrylate ester monomer adhesives are two-part, reactive adhesives which are prepared in a Part A and a Part B, which are maintained separated in a Part A chamber and a Part B chamber. The chambers can be, for example, compartments or separate containers or barrels or pails. Parts A and B are combined at the time of use, when they react and form the final adhesive. As is known in the art, there is wide latitude in which ingredients are put in the Part A and which ingredients are put in the Part B. An important requirement is that the ingredients which will initiate the reaction be kept separate or apart from the materials they will react with. This can be seen in the Examples which follow. The typical division into Parts A and B is known in the art and as shown in the Examples herein. Typically 10 parts by weight of Part A are combined with 1 part by weight of Part B. Alternatively the ratio of A:B can be about 5:1, 3:1, 2:1, 1:1, 1:2, 1:3 or 1:5 or other ratios.

With reference to FIG. 1, there is shown an applicator or kit 10 having a barrel 12 which has a nozzle 24. The barrel 12 includes two separate chambers or compartments, a first chamber 14 266 containing Part A of an adhesive composition according to the present invention and a second chamber 16 containing a corresponding Part B of an adhesive composition according to the present invention. The applicator 10 also has a pair or plungers 18 and 20 joined by a dual plunger handle 22. When the handle 22 is pushed down, Part A and Part B are expelled from their respective chambers and join and mix together as they come out of the nozzle 24. They are then preferably further mixed together so they can fully react to form the final adhesive. Alternatively a kit can be provided comprising a 55 gallon drum or barrel or chamber of Part A and a 5.5 gallon pail or chamber of Part B, to be mixed in an A:B ratio of 10:1.

The invented adhesive is preferably used to bond boat hulls, to bond the boat deck to the hull, in stringer bonding applications, and in plastic or metal structural bonding. The adhesive is also used for large part assembly or gap filling up to 1 inch where low exotherm and long open time is required to prevent "read-through".

The following Examples further illustrate various aspects of the invention. Unless otherwise indicated, the ingredients are combined and applied using methods known in the art.

Examples 1–4 show the ingredients of a preferred formulation of the invention, the amounts of the ingredients, and the effects of three Inventive retarding additives ($ZnCl_2$, $ZnI_2$, and $FeCl_3$) on certain characteristics of the adhesive compared to an adhesive with no Inventive retarding additive. Part A is parts by weight and Part B is weight percent. 10 parts of Part A is mixed with 1 part of Part B to form the final adhesive. The core shell polymer is Blendex 338.

|  | Part A | | | | |
| --- | --- | --- | --- | --- | --- |
| Example | 1 | 2 | 3 | 4 | Part B |
| Components | | | | | |
| Methyl methacrylate | 54.94 | 54.94 | 54.94 | 54.94 | 60.80 |
| Methacrylic acid | 1.74 | 1.74 | 1.74 | 1.74 | |
| Hydroxyethyl-methacrylate (HEMA) | 12.54 | 12.54 | 12.54 | 12.54 | |
| Chlorosulfonated polyethylene | 10.48 | 10.48 | 10.48 | 10.48 | |
| Core shell polymer | 17.95 | 17.95 | 17.95 | 17.95 | 20.39 |
| BHT | 1.06 | 1.06 | 1.06 | 1.06 | |
| Hydroquinone (HQ) | 0.05 | 0.05 | 0.05 | 0.05 | |
| EDTA Salt | 0.05 | 0.05 | 0.05 | 0.05 | |
| Tert-butyl peroxy-benzoate (TBPB) | 0.98 | 0.98 | 0.98 | 0.98 | |
| Wax 1977 | 0.22 | 0.22 | 0.22 | 0.22 | 0.19 |
| Reilcat ASY-2 | — | — | — | — | 18.62 |
| $ZnCl_2$ | — | 1.0 | — | — | |
| $ZnI_2$ | — | — | 0.49 | — | |
| $FeCl_3$ | — | — | — | 0.08 | |
| Examples 1–4, continued | | | | | |
| Set Time(min) | 35 | 165 | 74 | 14 | |
| Open Time(min) | 20 | 240 | 80 | 5 | |
| Exotherm Time(min) | 36 | 320 | 122 | 14 | |
| Peak Exotherm Temp. (° F.) | 283 | 218 | 246 | 160 | |
| Tensile Lap Shear on Al (psi) | 2750 | 3492 | 3325 | 1531 | |
| Mode of Failure | co/ad | co | co | ad | |

EXAMPLES 1–4 SUBSTRATE AND TEST CONDITIONS

Set Time—the time when two glass microscope slides, bonded perpendicularly, can no longer be moved relative to each other by hand Aluminum substrate was 2024-T3 aluminum Test method was ASTM D1002, using a bond thickness of 0.005 inches.

Co—denotes bond failure mode as cohesive; ad—denotes bond failure mode as adhesive.

The mixing procedure for Part A of the adhesive is as follows. All of the methyl methacrylate and all the chlorosulfonated polyethylene (Hypalon 30) is prepared with a high shear mixer, such as Cowles, Hockmeyer, or propeller mixer. The inhibitors, methacrylic acid, Inventive retarding additive, and other additives are mixed in, followed by addition of the core-shell polymer, with high shear mixing until a smooth paste is obtained. The remaining methacrylate monomers, if any, are added, and the contents are mixed until the temperature reaches 130° F. The peroxide initiator is added after cooling the contents to 90° F. The final mixture is de-aired under vacuum and discharged from the mixer. Part B is prepared by high shear mixing of the components as known in the art.

The Part A portion is mixed with the Part B portion, typically by passing both Parts A and B through a static mixer. The adhesive is typically dispensed as known in the art onto the substrate to be bonded. Typically the adhesive is spread onto only one of the two substrates. The substrates or parts to be bonded are brought together and held in place by a fixturing device, if necessary, until the adhesive sets and cures.

TEST RESULTS

The exotherm temperature, open time, and bond strength (tensile lap shear configuration) of Examples 1–4 are shown under their respective compositions. Compared to a.control (Example 1), without Inventive retarding additive, the peak exotherm temperature of Examples 2–4 is significantly lower after the addition of each Inventive retarding additive or retarder. With the exception of ferric chloride, open time and bond strength were improved favorably. The failure of ferric chloride to follow this trend appears to be tied to cyclic reduction and oxidation between $Fe^{3+}$ and $Fe^{2+}$. $Fe^{2+}$ tends to accelerate cure, while $Fe^{3+}$ tends to inhibit cure.

Unless specified otherwise, Examples 5–8 are the same as Examples 1–4. Examples 5–8 show a continuous decrease in peak exotherm temperature as $ZnCl_2$ content increases. Open time likewise continuously increases with $ZnCl_2$ content. Bond strength on stainless steel, Example 6, is 50% higher with a $ZnCl_2$ level of 0.65 parts. After exposing bonded test specimens to salt spray for two weeks, the composition containing $ZnCl_2$ exhibits bond strength which is approximately three times greater than the control.

Examples 5–8 are the same as Examples 1–4, except for the Inventive retarding additive.

| Example | 5 | 6 | 7 | 8 |
|---|---|---|---|---|
| $ZnCl_2$ level in Part A(parts by weight) | 0 | 0.65 | 0.8 | 1.0 |
| Set Time(min) | 35 | 75 | 120 | 165 |
| Open Time(min) | 20 | 90 | 180 | 240 |
| Exotherm Time(min) | 36 | 173 | 315 | 320 |
| Peak Exotherm Temp.(° F.) | 283 | 279 | 248 | 218 |
| Tensile Lap Shear on Al(psi) | 2750 | 3824 | 3510 | 3492 |
| Mode of Failure | co/ad | co | co | co |
| Tensile Lap Shear on Stainless Steel 304(psi) | 2299(ad) | 3452(co) | | |
| After two-week salt spray at 95° F./5% NaCl/95% RH | 1066(ad) | 3093(co) | | |

Over a period of months, methacrylate adhesives tend to consume the added inhibitors, which may lead to gelation. Accelerated shelf life tests were performed by exposing various compositions to a temperature of 82° C. and measuring the time it took them to form a gel, or for their viscosity to thicken beyond the point of being useful adhesives. Examples 9–14 demonstrate the ability of $ZnCl_2$ to work in synergy with certain other added inhibitors to increase shelf life dramatically. Examples 9–11 show that small amounts of hydroquinone, BHT, and EDTA can enable an adhesive composition to withstand 3–7 hours of heat exposure. Example 12 demonstrates that $ZnCl_2$, at a level of 0.02 parts by weight, with typical levels of BHT and hydroquinone, can dramatically increase shelf life. Examples 13–14 show that a low level of $ZnCl_2$ can also increase shelf life even with little or no BHT and hydroquinone.

| Example | 9 | 10 | 11 | 12 | 13 | 14 |
|---|---|---|---|---|---|---|
| Components Parts by wt. | | | | | | |
| MMA | 43.6 | 43.6 | 43.6 | 43.6 | 61.8 | 61.8 |
| MAA | 4.0 | 4.0 | 4.0 | 4.0 | 10.0 | 10.0 |
| HEMA | 11.8 | 11.8 | 11.8 | 11.8 | — | — |
| Hypalon30 | 22.0 | 22.0 | 22.0 | 22.0 | — | — |
| Blendex338 | 15.0 | 15.0 | 15.0 | 15.0 | — | — |
| CHP | 1.0 | 1.0 | 1.0 | 1.0 | — | — |
| Wax 1977 | 0.4 | 0.4 | 0.4 | 0.4 | — | — |
| Neoprene AD-5 | — | — | — | — | 15.0 | 15.0 |
| TMD | — | — | — | — | 0.5 | 0.5 |
| Chemigum P-83 | — | — | — | — | 12.7 | 12.7 |
| BHT | 1.0 | 2.0 | 2.0 | 2.0 | — | — |
| HQ | 0.05 | 0.1 | 0.3 | 0.1 | 0.02 | 0.02 |
| EDTA Salt | 0.05 | 0.1 | 0.1 | 0.1 | 0.02 | 0.02 |
| $ZnCl_2$ | — | — | — | 0.02 | — | 0.05 |
| Shelf Life (hours) | 3 | 5 | 7 | >40 | 5 | 7 |

The following Examples 15–18 show Part A of the formula. To each Part A was added Benox-50 (Part B) at a rate of 10 parts Part A to 1 part Benox-50 (Part B).

| | Part A | | | |
|---|---|---|---|---|
| Example | 15 | 16 | 17 | 18 |
| Components (parts by weight) | | | | |
| Methyl methacrylate | 60.38 | 60.0 | 62 | 62 |
| Methacrylic acid | 4.81 | 4.81 | 4.0 | 4.0 |
| Neoprene AD-5 | 24.51 | 24.51 | — | — |
| Kraton D-1116 | — | — | 16 | 16 |
| Chemigum P-83 | 4.53 | 4.0 | 7.5 | 7.5 |
| Butanediol dimethacrylate | 2.79 | 2.79 | — | — |
| TMD amine | 0.5 | 0.5 | 0.6 | 0.6 |
| DMT amine | 0.97 | 0.97 | 1.0 | 1.0 |
| BHT | — | — | 0.02 | 0.06 |
| Hydroquinone (HQ) | 0.02 | 0.02 | — | — |
| Methylhydroquinone | — | — | 0.02 | 0.02 |
| EDTA Salt | 0.02 | 0.02 | 0.02 | 0.02 |
| $TiO_2$ | — | — | 9.0 | 9.0 |
| $CaCO_3$ | — | — | 2.0 | 2.0 |
| Tinuvin 400 | — | — | 0.2 | 0.2 |
| Wax 1977 | — | 0.4 | 0.4 | 0.4 |
| Disparlon 6200 | 1.47 | 1.0 | 0.4 | 0.4 |
| $ZnCl_2$ | — | 1.0 | — | 1.0 |
| Open Time (min) | 4 | 40 | 5 | 50 |
| Exotherm Time (min) | 5 | 57 | 10 | 163 |
| Peak Exotherm Temp. (° F.) | 255 | 198 | 183 | 136 |

The open time, exotherm time and peak exotherm temperature of Examples 15–18 are shown under their respective compositions. Compared to the controls (Examples 15 and 17) without Inventive retarding additive, the peak exotherm temperature of Examples 16 and 18 are significantly lower with the addition of the Inventive retarding additive. Open time was improved dramatically. The results of the foregoing Examples 1–18 were surprising and unexpected. Although the preferred embodiments of the invention have been shown and described, it should be understood that various modifications and changes may be resorted to without departing from the scope of the invention as disclosed and claimed herein.

What is claimed is:

1. An adhesive composition consisting essentially of 10–90 weight percent ester monomer, about 2–85 weight percent polymeric elastomer, about 0.02–10 weight percent initiator, and about 0.005–7 weight percent of a retarding additive, said retarding additive being selected from the group consisting or non-protonic Lewis acids and zinc salts and mixtures thereof, said ester monomer being selected from the group consisting of methacrylate ester monomers, acrylate ester monomers and mixtures thereof, said retarding additive being present in an amount effective to (a) extend the open time of the adhesive composition at least five minutes or (b) reduce the peak exotherm temperature of the adhesive composition at least 15° F.

2. An adhesive composition according to claim 1, wherein said polymeric elastomer is selected from the group consisting of chlorosulfonated polyethylene, chlorinated polyethylene, polychloroprene and block copolymer rubber.

3. An adhesive composition according to claim 2, further comprising about 1–30 weight percent polymeric modifier selected from the group consisting of core shell polymers, nitrile rubber particles, polyamide powders and all-acrylic-copolymer resins.

4. An adhesive composition according to claim 2, wherein said retarding additive is selected from the group consisting of $FeBr_3$, $AlCl_3$, $SnCl_4$, $TiCl_4$, $Zn(CN)_2$, $ZnSO_4$, $ZnS$, $Zn(NO_3)_2$, $ZnF_2$, $BF_3$ and its ether complex, $FeCl_3$, $ZnBr_2$, $ZnCl_2$, $ZnI_2$ and mixtures thereof.

5. An adhesive composition according to claim 2, wherein said retarding additive is a transition metal halide.

6. An adhesive composition according to claim 2, wherein said retarding additive is selected from the group consisting of zinc halides.

7. An adhesive composition according to claim 2, wherein said retarding additive is present in an amount effective to reduce the peak exotherm temperature at least 15° F.

8. An adhesive composition according to claim 7, wherein said polymeric elastomer is chlorosulfonated polythylene and wherein said adhesive composition further comprises about 1–30 weight percent core shell polymer.

9. An adhesive composition according to claim 7, wherein said ester monomer is methyl methacrylate.

10. An adhesive composition according to claim 9, further comprising about 0.2–8 weight percent free-radical polymerizable acid monomer.

11. An adhesive composition according to claim 2, wherein said retarding additive is present in an amount effective to reduce the peak exotherm temperature at least 50° F.

12. An adhesive composition according to claim 2, wherein said retarding additive is present in an amount effective to extend the open time of the adhesive composition at least 20 minutes.

13. An adhesive composition according to claim 8, wherein said retarding additive is present in an amount effective to reduce the peak exotherm temperature at least 30° F. and wherein said ester monomer is methyl methacrylate.

14. A kit for providing a two-component reactive adhesive formulation, said kit comprising a Part A chamber and a Part B chamber, said Part A chamber containing a Part A composition, said Part B chamber containing a Part B composition which is reactable with said Part A composition, said Part A composition and said Part B composition being combinable in at preselected weight ratio to yield an adhesive composition consisting essentially of 10–90 weight percent ester monomer, about 2–85 weight percent polymeric elastomer, about 0.02–10 weight percent initiator, and about 0.005–7 weight percent of a retarding additive, said retarding additive being selected from the group consisting of non-protonic Lewis acids and zinc salts and mixtures thereof, said ester monomer being selected from the group consisting of methacrylate ester monomers, acrylate ester monomers and mixtures thereof, said retarding additive being present in an amount effective to (a) extend the open time of the adhesive composition at least five minutes or (b) reduce the peak exotherm temperature of the adhesive composition at least 15° F.

15. A kit according to claim 14, wherein said polymeric elastomer is selected from the group consisting of chlorosulfonated polyethylene, chlorinated polyethylene, polychloroprene and block copolymer rubber.

16. A kit according to claim 15, said adhesive composition further comprising about 1–30 weight percent polymeric modifier selected from the group consisting of core shell polymers, nitrile rubber particles, polyamide powders and all-acrylic copolymer resins.

17. A kit according to claim 15, wherein said retarding additive is selected from the group consisting of $FeBr_3$, $AlCl_3$, $SnCl_4$, $TiCl_4$, $Zn(CN)_2$, $ZnSO4$, $ZnS$, $Zn(NO_3)_2$, $ZnF_2$, $BF_3$ and its ether complex, $FeCl_3$, $ZnBr_2$, $ZnCl_2$, $ZnI_2$ and mixtures thereof.

18. A kit according to claim 15, wherein said retarding additive is a transition metal halide.

19. A kit according to claim 15, wherein said retarding additive is present in an amount effective to reduce the peak exotherm temperature of said adhesive composition at least 15° F.

20. A kit according to claim 19, wherein said polymeric elastomer is chlorosulfonated polyethylene and wherein said adhesive composition further comprises about 1–30 weight percent core shell polymer.

21. A kit according to claim 15, wherein each of said Part A chamber and said Part B chamber is selected from the group consisting of drums, barrels and pails.

22. An adhesive composition according to claim 1, further comprising one or more components selected from the group consisting of acid monomers, polymeric modifiers, antioxidants, inhibitors, scavengers, activators and waxes.

23. A kit according to claim 14, said adhesive composition further comprising one or more components selected from the group consisting of acid monomers, polymeric modifiers, antioxidants, inhibitors, scavengers, activators and waxes.

24. A method of bonding a first substrate to a second substrate comprising the step of applying an adhesive composition to said first substrate and bonding said second substrate thereto said adhesive composition consisting essentially of 10–90 weight percent ester monomers, about 2–85 weight percent polymeric elastomer, about 0.02–10 weight percent initiator, and about 0.005–7 weight percent of a retarding additive, said retarding additive being selected from the group consisting of non-protonic Lewis acids and zinc salts and mixtures thereof, said ester monomer being selected from the group consisting of methacrylate ester. monomers, acrylate ester monomers and mixtures thereof, said retarding additive being present in an amount effective to (a) extend the open time of the adhesive composition at least five minutes or (b) reduce the peak exotherm temperature of the adhesive composition at least 15° F.

25. A method according to claim 24, said adhesive composition further comprising one or more components selected from the group consisting of acid monomers, polymeric modifiers, antioxidants, inhibitors, scavengers, activators and waxes.

26. A method according to claim 24, wherein one of said substrates is a boat hull.

* * * * *

UNITED STATES PATENT AND TRADEMARK OFFICE
CERTIFICATE OF CORRECTION

PATENT NO. : 6,291,593 B1 Page 1 of 1
DATED : September 18, 2001
INVENTOR(S) : Haitao Cheng It is certified that error appears in the above-identified patent and that said Letters Patent is hereby corrected as shown below:

Column 2,
Line 30, after "hydrogen" insert -- . --
Line 31, before "preferred" insert -- a --

Column 4,
Line 25, after "preferably" delete -- . --

Column 5,
Line 14, change "floride" to -- fluoride --
Line 14, change "trif luoride" to -- trifluoride --
Line 57, change "or" to -- of --

Column 7,
Line 18, before "control" delete -- . --

Column 9,
Line 7, change "or" to -- of --

Column 10,
Line 47, change "monomers" to -- monomer --
Line 53, delete "."

Signed and Sealed this

Twenty-third Day of July, 2002

Attest:

JAMES E. ROGAN
Attesting Officer        Director of the United States Patent and Trademark Office